United States Patent
Park et al.

(10) Patent No.: US 10,306,691 B2
(45) Date of Patent: May 28, 2019

(54) METHOD OF PROVIDING SERVICES TO USER EQUIPMENT HAVING MULTIPLE ANTENNA UNITS

(71) Applicant: LG ELECTRONICS INC., Seoul (KR)

(72) Inventors: Kungmin Park, Seoul (KR); Jiwon Kang, Seoul (KR); Kitae Kim, Seoul (KR); Kilbom Lee, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/738,542

(22) PCT Filed: Mar. 28, 2016

(86) PCT No.: PCT/KR2016/003119
§ 371 (c)(1),
(2) Date: Dec. 20, 2017

(87) PCT Pub. No.: WO2016/208852
PCT Pub. Date: Dec. 29, 2016

(65) Prior Publication Data
US 2018/0192464 A1    Jul. 5, 2018

Related U.S. Application Data

(60) Provisional application No. 62/182,625, filed on Jun. 21, 2015.

(51) Int. Cl.
*H04B 7/06* (2006.01)
*H04W 48/20* (2009.01)
(Continued)

(52) U.S. Cl.
CPC .......... *H04W 76/15* (2018.02); *H04B 7/0413* (2013.01); *H04B 7/0697* (2013.01); *H04W 48/20* (2013.01)

(58) Field of Classification Search
CPC . H04W 76/15; H04W 48/20; H04W 72/0413; H04W 12/10; H04W 12/04;
(Continued)

(56) References Cited

U.S. PATENT DOCUMENTS

2013/0054051 A1    2/2013 Cuddihy et al.
2014/0050193 A1    2/2014 Cho et al.
(Continued)

OTHER PUBLICATIONS

PCT International Application No. PCT/KR2016/003119, Notification of Transmittal of the International Search Report and the Written Opinion of the International Searching Authority, or Declaration dated Sep. 22, 2016, 12 pages.
(Continued)

*Primary Examiner* — Ian N Moore
*Assistant Examiner* — Brian T Le
(74) *Attorney, Agent, or Firm* — Lee Hong Degerman Kang Waimey

(57) ABSTRACT

The present document is for a wireless communication using multiple antenna units based on new virtual user equipment (virtual UE) concept. A user equipment (UE), according to the present invention, receives service from a network in a wireless communication system by registering multiple antenna units of the UE as two or more virtual UEs with a first network entity of the network, wherein the first network entity is a network node for physical radio link control; and receiving the service from the network by the two or more virtual UEs. The two or more virtual UEs of the UE are recognized as one UE by network entities of the network other than the first network entity.

13 Claims, 15 Drawing Sheets

(51) Int. Cl.
*H04W 76/15* (2018.01)
*H04B 7/0413* (2017.01)
(58) Field of Classification Search
CPC ... H04W 4/028; H04B 7/0413; H04B 7/0697; H04B 1/3822; H04L 67/12
See application file for complete search history.

(56) References Cited

U.S. PATENT DOCUMENTS

2015/0111508 A1   4/2015   Hansen
2015/0173067 A1   6/2015   Dinan

OTHER PUBLICATIONS

3rd Generation Partnership Project (3GPP), "Technical Specification Group Services and System Aspects; Vocabulary For 3GPP Specifications (Release 7)," 3GPP TR 21.905 V7.0.0, Sep. 2005, 55 pages.

FIG. 2
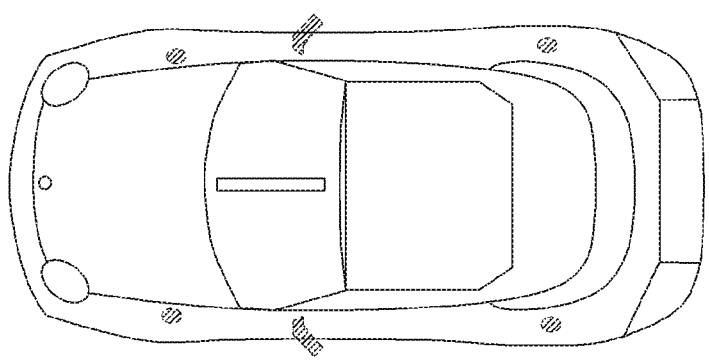
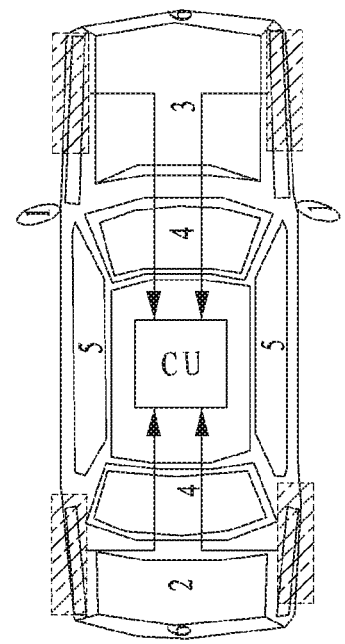

| UE ID | Corresponding DU (sub-array) | UE IDs |
|---|---|---|
| ID 0 (RNTI #1) | all DUs | default UE ID recognized by all entry of network |
| ID 1 (RNTI #2) | DU 1 | virtual UE ID |
| ID 2 (RNTI #3) | DU 2 | virtual UE ID |
| ID 3 (RNTI #4) | DU 3 & DU 4 | virtual UE ID |
| ID 4 (RNTI #5) | DU 1 & DU 2 | virtual UE ID |

METHOD OF PROVIDING SERVICES TO USER EQUIPMENT HAVING MULTIPLE ANTENNA UNITS

CROSS-REFERENCE TO RELATED APPLICATIONS

This application is the National Stage filing under 35 U.S.C. 371 of International Application No. PCT/KR2016/003119, filed on Mar. 28, 2016, which claims the benefit of U.S. Provisional Application No. 62/182,625, filed on Jun. 21, 2015, the contents of which are all hereby incorporated by reference herein in their entirety.

TECHNICAL FIELD

The present document is for a wireless communication system. More particularly, the present document is for a wireless communication using multiple antenna units.

While the present document mainly discusses this with the example of implementing an in-vehicle distributed antenna system (DAS), it is only exemplary. The proposed scheme/structure can be used for simple configuration of multiple input-multiple output (MIMO) system with increased number of codewords/layers.

BACKGROUND ART

In the conventional mobile communication system for mainly serving personal mobile communication devices, there is an inverse proportional relationship between the speed of the UE and required data rate and quality of service (QoS). So, the conventional communication system is configured to provide high data rate/QoS for low speed UE, and to provide reliable service without radio link failure for the high speed UE even if the data rate/QoS is somewhat low.

In the next generation communication system, there is a need for high data rate/QoS for the high speed UE, since the scope of the required service increase. For example, the users in the vehicle or public transportation would like to enjoy multi-media service during the drive on a highway. Also, users want to enjoy multi-media service more while the speed of the vehicle is high.

In order to fulfil these needs, there can be two approaches. One is improving the network infra itself for high quality service to high speed users, and the other is a new system/scheme for this without affecting significantly the network infrastructure.

As one of the solution for the second approach, a vehicular MIMO system is considered. In conventional vehicular MIMO system, large size antenna arrays are implemented to the vehicle for this end. However, implementing the large size antenna array in the outside of vehicle has drawbacks for vehicle design and for aerodynamics. So, the vehicle vendors are reluctant to implement this kind of large antenna array. Presently, vendors prefer to use shark antenna system in their vehicle.

FIG. 1 shows a structure of conventional shark antenna system for vehicular communication.

The conventional shark antenna system is a combinational antenna system. As shown in FIG. 1, the shark antenna system implemented various antennas within one physical structure. In FIG. 1, the shark antenna includes combined structure for 4 or more different band/services in one antenna. So, it has limit for providing high quality mobile communication service.

However, the reason why the vendors prefer this instead of large antenna system is to reduce the space for the antennas. Large sized antennas are not good for car design and reduce the original driving performance of the vehicle.

DISCLOSURE

Technical Problem

In order to solve this problem, the inventors of the present invention proposed to use an in-vehicular distributed antenna system (hereinafter, in-vehicle DAS system).

FIG. 2 shows a concept of in-vehicle DAS system implemented into a car.

As shown in FIG. 2, in-vehicle DAS system uses relatively small multiple antenna units distributed within the vehicle. Multiple antenna units may be arranged at the corners of the car as shown in FIG. 2, for example. These multiple antenna units can be referred to as DUs (Distributed Units). A CU (central unit) of in-vehicle DAS system can control each of the DUs of the vehicle.

Since DUs are separated within the vehicle, the physical channel characteristics would be different and independent. This can provide diversity gain, but it can increase signaling overhead in order to consider each of the physical channel characteristics.

Also, in order to implement in-vehicle DAS system, additional consideration is required comparing to the conventional MIMO system.

FIGS. 3 and 4 show an example of required additional consideration for cell selection when in-vehicle DAS system is implemented.

In the conventional mobile communication system, the cell selection is performed when the signal strength of the received signal decreases and there is another cell with higher signal strength. That is, the cell selection is performed only based on the signal strength of each cell. But, when an in-vehicle DAS system is implemented, it would be better to consider also the diversity of the ray for each DU.

In FIG. 3, a big truck is moving along with the vehicle in communication. If the two vehicles have similar speeds, the rays from a network in certain direction might be blocked for a significant amount of time. It might degrade the quality of service for users in the vehicle. So, it would be better to consider also the diversity of rays when performing cell selection.

As shown in FIG. 4, the first cell (c0) is the closest cell providing the strongest signal, but it provides only one directional ray. But, the second cell (c1) provides various rays even if its signal strength is somewhat lower than the first cell (c0). In this case, the second cell (c1) can be a better choice since the diversity in ray distribution provides a more stable service as explained with FIG. 3.

So, an in-vehicle DAS system may require additional consideration and the complexity is increased.

Also, in order to implement an in-vehicle DAS system, the number of codewords/layers might be increased compared to conventional fourth generation (4G) long-term evolution (LTE) and LTE-advanced (LTE-A) systems.

FIG. 5 shows a procedure for uplink MIMO transmission in LTE-A system.

In the LTE-A system, 2 codewords are supported for simultaneous transmission in uplink. Codewords are scrambled by using the UE specific ID and cell ID (301). The scrambled codewords are modulated to obtain modulation symbol streams (302). Then, they are mapped to a certain number of layers (303). In LTE-A, up to 4 layers are supported for uplink transmission. Mapping relationship between codewords and layers is as follows.

TABLE 1

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 3 | 2 | $x^{(0)}(i) = d^{(0)}(i)$ $x^{(1)}(i) = d^{(1)}(2i)$ $x^{(2)}(i) = d^{(1)}(2i + 1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M_{symb}^{layer} = M_{symb}^{(0)}/2 = M_{symb}^{(1)}/2$ |

Here, $M_{symb}^{layer}$ represents the number of symbols for each layer and $M_{symb}^{(q)}$ represents the number of symbols for codeword q. '$x^{(k)}(i)$' represents the (i+1)-th symbol for the (k+1)-th layer and '$d^{(q)}(i)$' represents the (i+1)-th symbol for the (q+1)-th codeword.

Then, the layers are precoded with certain precoding matrixes (304). Precoding matrixes for uplink transmission are selected in a codebook which depends on the number of layers used. The codebooks are defined as follows.

TABLE 2

| Codebook index | Number of layers $v = 1$ |
|---|---|
| 0-7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |
| 8-15 | $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |
| 16-23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |

TABLE 4

| Codebook index | Number of layers $v = 3$ |
|---|---|
| 0-3 | $\frac{1}{2}\begin{bmatrix}1&0&0\\1&0&0\\0&1&0\\0&0&1\end{bmatrix}$ $\frac{1}{2}\begin{bmatrix}1&0&0\\-1&0&0\\0&1&0\\0&0&1\end{bmatrix}$ $\frac{1}{2}\begin{bmatrix}1&0&0\\0&1&0\\1&0&0\\0&0&1\end{bmatrix}$ $\frac{1}{2}\begin{bmatrix}1&0&0\\0&1&0\\-1&0&0\\0&0&1\end{bmatrix}$ |
| 4-7 | $\frac{1}{2}\begin{bmatrix}1&0&0\\0&1&0\\0&0&1\\1&0&0\end{bmatrix}$ $\frac{1}{2}\begin{bmatrix}1&0&0\\0&1&0\\0&0&1\\-1&0&0\end{bmatrix}$ $\frac{1}{2}\begin{bmatrix}0&1&0\\1&0&0\\1&0&0\\0&0&1\end{bmatrix}$ $\frac{1}{2}\begin{bmatrix}0&1&0\\1&0&0\\-1&0&0\\0&0&1\end{bmatrix}$ |
| 8-11 | $\frac{1}{2}\begin{bmatrix}0&1&0\\1&0&0\\0&0&1\\1&0&0\end{bmatrix}$ $\frac{1}{2}\begin{bmatrix}0&1&0\\1&0&0\\0&0&1\\-1&0&0\end{bmatrix}$ $\frac{1}{2}\begin{bmatrix}0&1&0\\0&0&1\\1&0&0\\1&0&0\end{bmatrix}$ $\frac{1}{2}\begin{bmatrix}0&1&0\\0&0&1\\0&0&1\\-1&0&0\end{bmatrix}$ |

TABLE 3

| Codebook index | Number of layers υ = 2 | | | |
|---|---|---|---|---|
| 0-3 | $\frac{1}{2}\begin{bmatrix} 1 & 0 \\ 1 & 0 \\ 0 & 1 \\ 0 & -j \end{bmatrix}$ | $\frac{1}{2}\begin{bmatrix} 1 & 0 \\ 1 & 0 \\ 0 & 1 \\ 0 & j \end{bmatrix}$ | $\frac{1}{2}\begin{bmatrix} 1 & 0 \\ -j & 0 \\ 0 & 1 \\ 0 & 1 \end{bmatrix}$ | $\frac{1}{2}\begin{bmatrix} 1 & 0 \\ -j & 0 \\ 0 & 1 \\ 0 & -1 \end{bmatrix}$ |
| 4-7 | $\frac{1}{2}\begin{bmatrix} 1 & 0 \\ -1 & 0 \\ 0 & 1 \\ 0 & -j \end{bmatrix}$ | $\frac{1}{2}\begin{bmatrix} 1 & 0 \\ -1 & 0 \\ 0 & 1 \\ 0 & j \end{bmatrix}$ | $\frac{1}{2}\begin{bmatrix} 1 & 0 \\ j & 0 \\ 0 & 1 \\ 0 & 1 \end{bmatrix}$ | $\frac{1}{2}\begin{bmatrix} 1 & 0 \\ j & 0 \\ 0 & 1 \\ 0 & -1 \end{bmatrix}$ |
| 8-11 | $\frac{1}{2}\begin{bmatrix} 1 & 0 \\ 0 & 1 \\ 1 & 0 \\ 0 & 1 \end{bmatrix}$ | $\frac{1}{2}\begin{bmatrix} 1 & 0 \\ 0 & 1 \\ 1 & 0 \\ 0 & -1 \end{bmatrix}$ | $\frac{1}{2}\begin{bmatrix} 1 & 0 \\ 0 & 1 \\ -1 & 0 \\ 0 & 1 \end{bmatrix}$ | $\frac{1}{2}\begin{bmatrix} 1 & 0 \\ 0 & 1 \\ -1 & 0 \\ 0 & -1 \end{bmatrix}$ |
| 12-15 | $\frac{1}{2}\begin{bmatrix} 1 & 0 \\ 0 & 1 \\ 0 & 1 \\ 1 & 0 \end{bmatrix}$ | $\frac{1}{2}\begin{bmatrix} 1 & 0 \\ 0 & 1 \\ 0 & -1 \\ 1 & 0 \end{bmatrix}$ | $\frac{1}{2}\begin{bmatrix} 1 & 0 \\ 0 & 1 \\ 0 & 1 \\ -1 & 0 \end{bmatrix}$ | $\frac{1}{2}\begin{bmatrix} 1 & 0 \\ 0 & 1 \\ 0 & -1 \\ -1 & 0 \end{bmatrix}$ |

TABLE 5

| Codebook index | Number of layers υ = 4 |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

Precoded symbols are mapped to resource elements (305) and processed to form single carrier-frequency division multiple access (SC-FDMA) signals (306).

The processing chain for downlink MIMO transmission is similar to FIG. 5, but the LTE-A system supports up to 2 codewords and 8 layers in simultaneous transmission. So, the layer mapping relation is extended as follows.

TABLE 6

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = M_{symb}^{(0)}/3$ |
| 3 | 2 | $x^{(0)}(i) = d^{(0)}(i)$ $x^{(1)}(i) = d^{(1)}(2i)$ $x^{(2)}(i) = d^{(1)}(2i + 1)$ | $M_{symb}^{layer} = M_{symb}^{(0)} = M_{symb}^{(1)}/2$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = M_{symb}^{(0)}/4$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M_{symb}^{layer} = M_{symb}^{(0)}/2 = M_{symb}^{(1)}/2$ |
| 5 | 2 | $x^{(0)}(i) = d^{(0)}(2i)$ $x^{(1)}(i) = d^{(0)}(2i + 1)$ $x^{(2)}(i) = d^{(1)}(3i)$ $x^{(3)}(i) = d^{(1)}(3i + 1)$ $x^{(4)}(i) = d^{(1)}(3i + 2)$ | $M_{symb}^{layer} = M_{symb}^{(0)}/2 = M_{symb}^{(1)}/3$ |
| 6 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(3i)$ $x^{(4)}(i) = d^{(1)}(3i + 1)$ $x^{(5)}(i) = d^{(1)}(3i + 2)$ | $M_{symb}^{layer} = M_{symb}^{(0)}/3 = M_{symb}^{(1)}/3$ |
| 7 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(4i)$ $x^{(4)}(i) = d^{(1)}(4i + 1)$ $x^{(5)}(i) = d^{(1)}(4i + 2)$ $x^{(6)}(i) = d^{(1)}(4i + 3)$ | $M_{symb}^{layer} = M_{symb}^{(0)}/3 = M_{symb}^{(1)}/4$ |
| 8 | 2 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = M_{symb}^{(0)}/4 = M_{symb}^{(1)}/4$ |

TABLE 6-continued

| Number of layers | Number of codewords | Codeword-to-layer mapping $i = 0, 1, \ldots, M_{symb}^{layer} - 1$ |
|---|---|---|
| | | $x^{(4)}(i) = d^{(1)}(4i)$ |
| | | $x^{(5)}(i) = d^{(1)}(4i + 1)$ |
| | | $x^{(6)}(i) = d^{(1)}(4i + 2)$ |
| | | $x^{(7)}(i) = d^{(1)}(4i + 3)$ |

The codebooks for downlink transmission are also extended.

So, when the supported numbers of codewords and layers increase to implement an in-vehicle DAS system, standardization for this would be very complicated.

Technical Solution

To achieve these and other advantages, as embodied and broadly described, a method for a user equipment (UE) to receive a service from a network in a wireless communication system is proposed. For a UE having multiple antenna units, the method comprises: registering multiple UE identities with a first node of the network, each of the multiple UE identities being associated with one of a plurality of user terminations of the UE, each user termination including a respective subset of at least one of the multiple antenna units of the UE; and receiving the service through a bearer with the network by using the multiple UE identities.

'User terminations' are entities which are seen as distinct UEs, with corresponding UE identities, by one or more network nodes, for example an evolved Node B (eNB), in view of the different antenna units that they use, while one or more other network nodes operating at a higher level (bearer), for example nodes of an Evolved Packet Core (EPC) are not aware of such a distinction and can control delivery of the service and its quality. Such features provide flexibility to manage radio links between the UE and the network without impacting QoS management. It is well suited, in particular to fast moving UE, e.g. for an in-vehicle DAS system.

'User terminations' may also be referred to as 'virtual UEs' or NUEs', both terms being used alternatively in the following.

In an embodiment, receiving the service through the bearer is performed via a plurality of logical channels between the first node and the plurality of the user terminations. The method may further comprise, for each of the logical channels: configuring a first Radio Link Control, RLC, protocol entity in the first node of the network and a second RLC protocol entity in the UE. It may also comprise, for each of the logical channels: configuring a first Packet Data Convergence Protocol, PDCP, entity in the first node of the network and a second PDCP entity in the UE, wherein the first and second PDCP entities manage IP headers of service data processed by the first and second RLC protocol entities.

The plurality of user terminations of the UE are typically recognized as one UE by nodes of the network other than the first node.

In one example, the multiple antenna units of the UE are located in separate locations within the UE.

In an embodiment, the bearer for receiving the service by using the multiple UE identities provides Internet protocol, IP, connectivity between the UE and a network gateway interfaced with a packet data network.

The multiple UE identities may comprise Radio Network Temporary Identifiers, RNTIs.

Where multiple bearers are established for multiple services from the network, the multiple bearers may comprise the bearer for receiving the service by using the multiple UE identities and at least one other bearer established by using the UE identity associated with one user termination.

In an embodiment, the first network node is an eNB establishing one or more radio bearers with the UE and establishing one or more S1 bearers with a serving gateway, S-GW, of the network. The multiple UE identities used to receive the service through the bearer may be associated with respective user terminations which share one radio bearer related with one S1 bearer.

Another aspect of the invention relates to a method for a network to provide a service to a UE in a wireless communication system, wherein the UE has multiple antenna units. The method comprises: registering multiple UE identities at a first node of the network, each of the multiple UE identities being associated with one of a plurality of user terminations of the UE, each user termination including a respective subset of at least one of the multiple antenna units of the UE; and providing the service to the UE through a bearer with the network by using the multiple UE identities.

Yet another aspect of the invention relates to a UE for receiving a service from a network in a wireless communication system. The UE comprises: multiple antenna units; a transceiver coupled to the multiple antenna units and configured to transmit or receive signal to or from the network; and a processor connected to the transceiver and configured to control the transceiver. The processor is further configured: to register multiple UE identities with a first node of the network, each of the multiple UE identities being associated with one of a plurality of user terminations of the UE, each user termination including a respective subset of at least one of the multiple antenna units; and to receive the service through a bearer with the network by using the multiple UE identities.

Yet another aspect of the invention relates to a network node for providing a service to a UE having multiple antenna units in a wireless communication system. The network node comprises: a transceiver configured to transmit or receive signal to or from the UE; and a processor connected to the transceiver and configured to control the transceiver. The processor is further configured: to register multiple UE identities, each of the multiple UE identities being associated with one of a plurality of user terminations of the UE, each user termination including a respective subset of at least one of the multiple antenna units of the UE; and to provide the service to the UE through a bearer by using the multiple UE identities.

Advantageous Effects

By using the above scheme, the standardization for high rank communication and simultaneous multiple codewords transmission can be simplified, and high communication throughput can be obtained without significantly effecting conventional network configurations.

Effects obtainable from the present invention may be non-limited by the above mentioned effect. And, other unmentioned effects can be clearly derived and understood from the following description by those having ordinary skill in the technical field to which the present invention pertains. Moreover, the present invention may have an unexpected advantage while those skilled in the art implement the present invention based on the following description.

DESCRIPTION OF DRAWINGS

The accompanying drawings, which are included to provide a further understanding of the invention, provide embodiments of the present invention together with a detailed explanation. A technical characteristic of the present invention is not limited by a specific drawing. A new embodiment can be configured by combining characteristics disclosed in each drawing with each other. Reference numerals in each drawing mean structural elements.

FIG. 2 shows a concept of in-vehicle DAS system implemented into a car.

MODE FOR INVENTION

Figure 1:
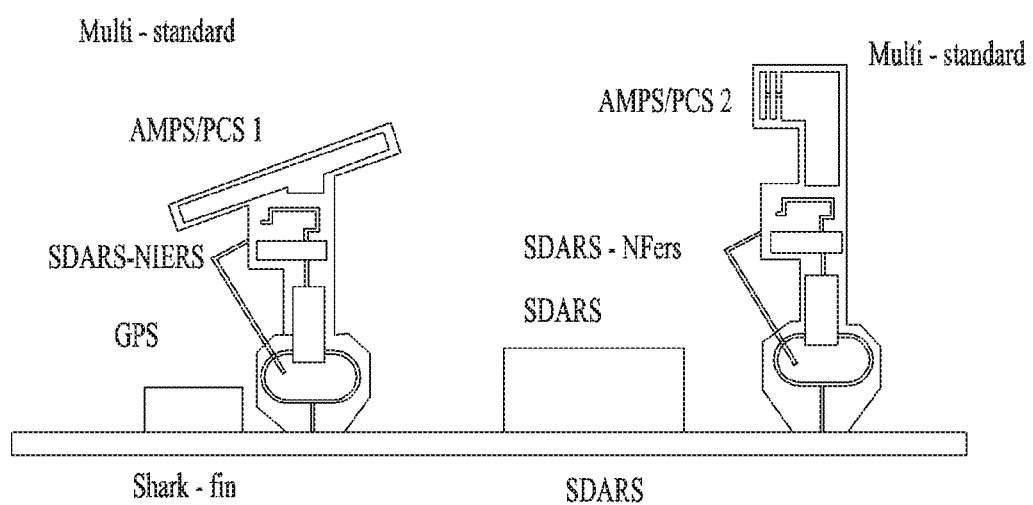
FIG. 1 shows a structure of conventional shark antenna system for vehicular communication.
Figure 3:
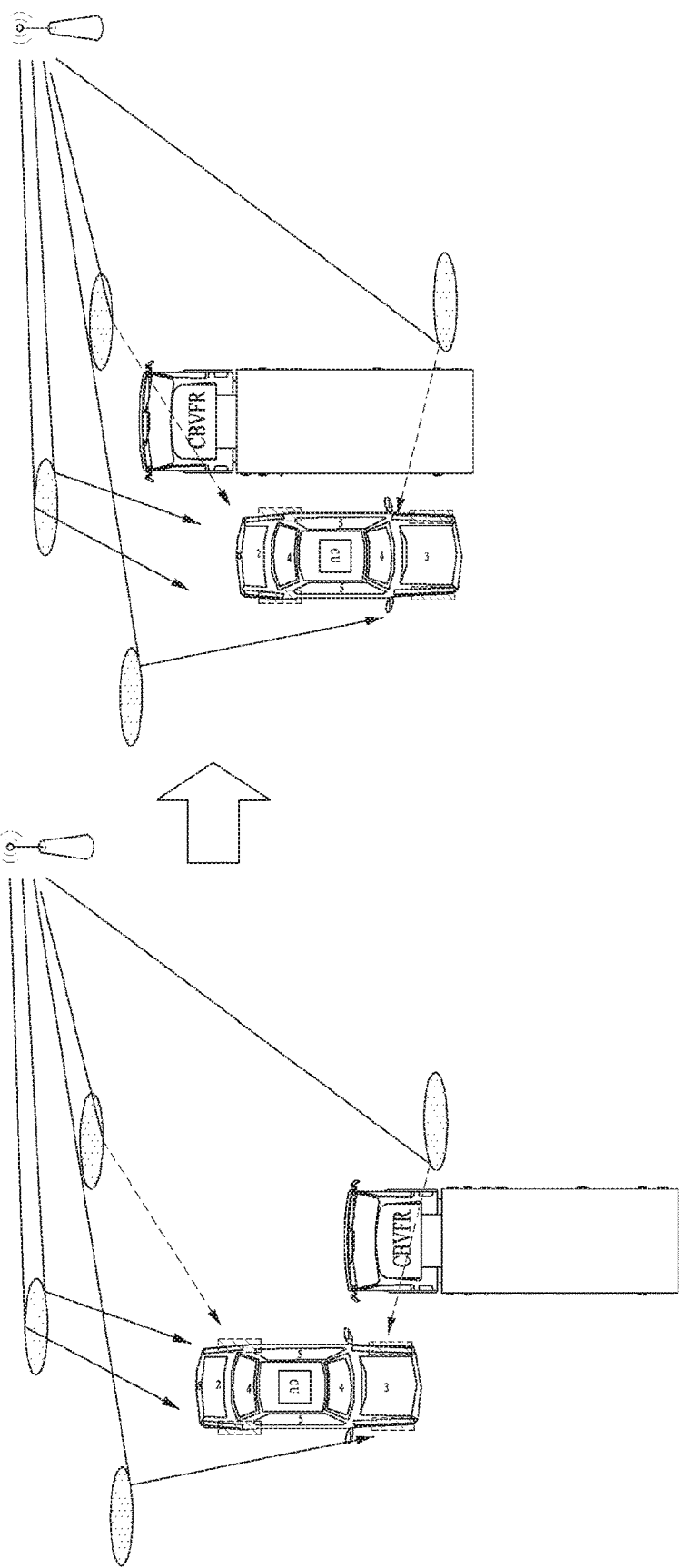
FIGS. 3 and 4 show an example of required additional consideration for cell selection when in-vehicle DAS system is implemented.
Figure 4:
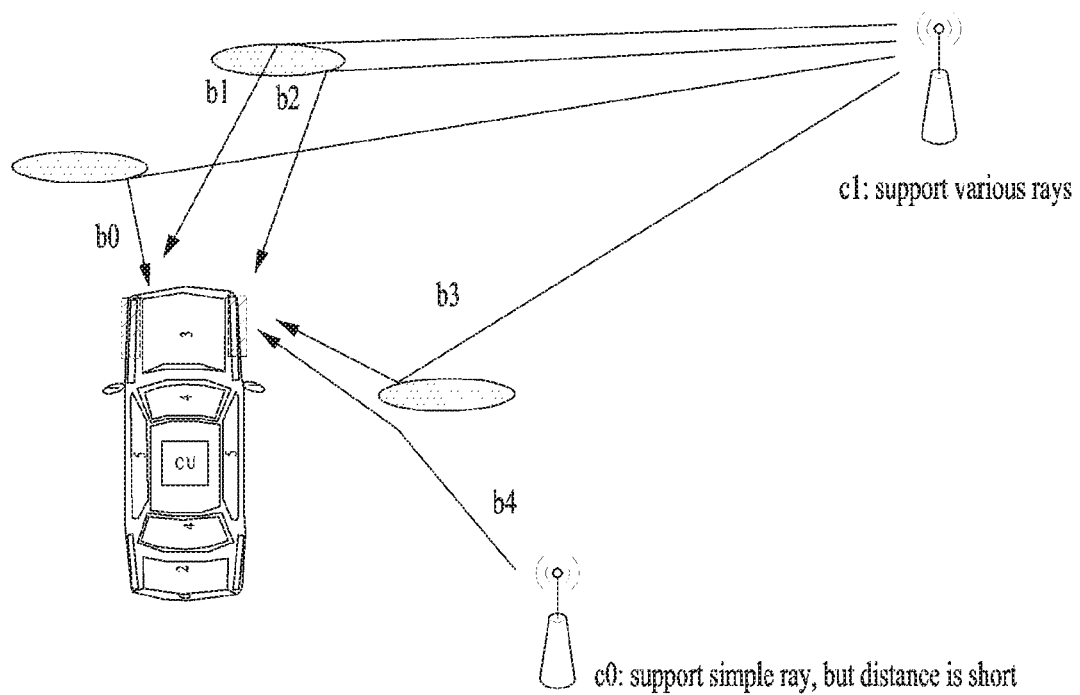
Figure 5:
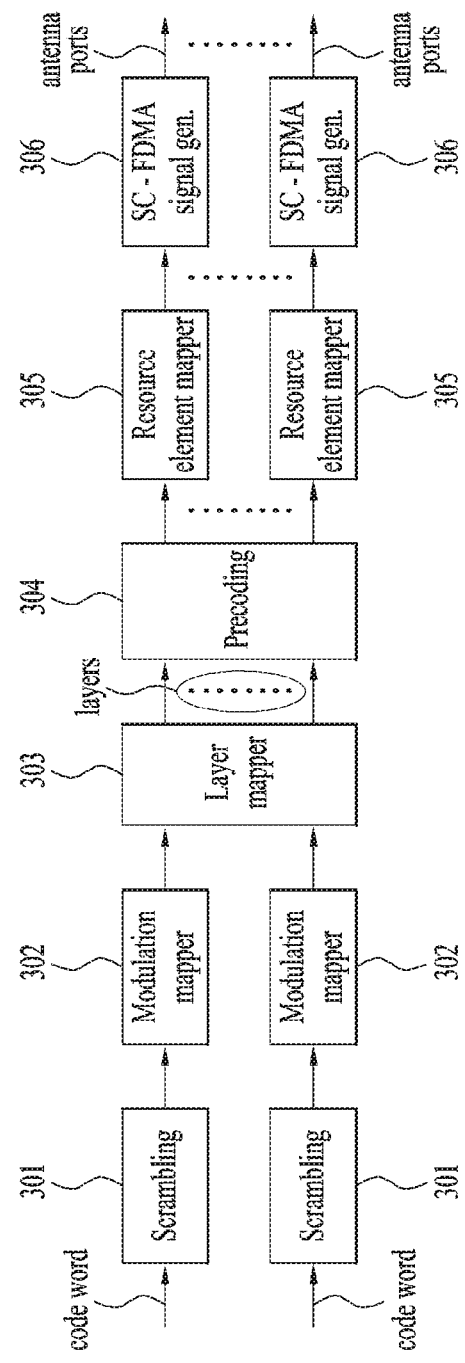
FIG. 5 shows a procedure for uplink MIMO transmission in LTE-A system.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Procedures or steps probably making the point of the present invention unclear are skipped and procedures or steps understandable by those skilled in the art are also skipped as well.

In the present application, such a terminology as 'comprise', 'include' or the like should be construed not as excluding a different component but as further including the different component unless there is a special citation. And, in the present specification, such a terminology as ' . . . unit', ' . . . device', 'module' or the like means a unit for processing at least one function or an operation and can be implemented by a hardware, a software, or a combination thereof. Moreover, "a or an", "one", "the" or a similar related word can be used as a meaning including both a singular number and a plural number in the following contexts (in particular, in the following contexts of the claims) unless it is clearly contradicted to a context of the present invention.

In the present specification, the embodiments of the present invention are explained in a manner of mainly concerning data transmission and reception between a base station and a mobile station. In this case, the base station has a meaning of a terminal node of a network performing a direct communication with the mobile station. In the present disclosure, a specific operation, which is explained as performed by the base station, may be performed by an upper node of the base station in some cases.

In particular, in a network constructed with a plurality of network nodes including a base station, it is apparent that various operations performed for communication with a mobile station can be performed by the base station or other networks except the base station. 'Base station (BS)' may be substituted with such a terminology as a fixed station, a Node B, an eNode B (eNB), an advanced base station (ABS), an access point (AP) and the like.

And, a mobile station (MS) may be substituted with such a terminology as a user equipment (UE), a subscriber station (SS), a mobile station subscriber station (MSS), a mobile terminal (MT), an advanced mobile station (AMS), a terminal, and the like.

And, a transmitting end corresponds to a fixed and/or mobile node providing a data service or an audio service and a receiving end corresponds to a fixed and/or mobile node receiving the data service or the audio service. Hence, a mobile station becomes the transmitting end and a base station may become the receiving end in uplink. In the same manner, the mobile station becomes the receiving end and the base station may become the transmitting end in downlink.

And, when a device performs communication with a 'cell', it may indicate that the device transceives a signal with a base station of the cell. In particular, although the device actually transmits and receives a signal with a specific base station, for clarity, it may be represented as the device transmits and receives a signal with a cell formed by the specific base station. Similarly, a 'macro cell' and/or 'small cell' may indicate a specific coverage, respectively. Moreover, the 'macro cell' and/or the 'small cell' may indicate a 'macro base station supporting the macro cell' and a 'small cell base station supporting the small cell', respectively.

The embodiments of the present invention can be supported by standard documents disclosed in at least one of IEEE 802.xx system, 3GPP system, 3GPP LTE system and 3GPP2 system. In particular, unmentioned clear steps or parts of the embodiments of the present invention can be explained with reference to the aforementioned standard documents And, all terminologies disclosed in the present specification can be explained by the aforementioned standard document. In particular, embodiments of the present invention can be supported by at least one of a standard document of IEEE 802.16 including P802.16e-2004, P802.16e-2005, P802.16.1, P802.16p, and P802.16.1b.

In the following, preferred embodiment according to the present invention is explained in detail with reference to attached drawings. Detailed description disclosed together with the accompanying drawings is intended to explain not a unique embodiment of the present invention but an exemplary embodiment of the present invention.

Moreover, specific terminologies used in the embodiments of the present invention are provided to help understanding of the present invention and the use of the specific terminologies can be modified in a different form in a scope without departing from the technical idea of the present invention.

Proposed Virtual UE Concept in an Example of in-Vehicle DAS

In an in-vehicle DAS structure, DUs are physically spaced apart from each other. Due to the vehicle having a metal surface, the DUs have different radiation patterns according to installation position. In addition, by reflection and propagation of the metal surface, a channel between the eNB and each DU has properties such as lower correlation and higher independence as compared to a channel between the eNB and each receiving (Rx) unit in a general linear array structure.

Using this, each DU is capable of performing transmission and reception as an individual user independent from the other DUs. Also, one or more groups of DUs can be defined, such that each group performs transmission and reception as an individual user independent from the DUs that do not belong to the group.

A scheme for reporting DUs belonging to one vehicle to some entries of the network like different UEs and implementing high rank transmission and reception through the different UEs is referred to as a virtual user registration scheme or 'virtual UE scheme'. The independent UE (as seen by the lower layers) which consists of one or more DUs and associated low layer processing units is called a 'virtual UE' (VUE). A virtual UE is also referred to as a user termination in the present document. Through virtual user registration, the problems of the standardization and implementation can be solved and the following gains specialized for the in-vehicle DAS can be obtained:

when designating VUEs, QoS management does not have to be performed for each VUE or DU. Integrated management via one bearer is possible: some entities of the network other than eNB (for example, MME, S-GW, etc) recognize the vehicle as a single user;

a multi-user channel is established between the eNB and the vehicle, and the eNB proceeds to control transmissions to each VUE or DU and receptions of feedback from each VUE or DU. The other devices are not affected by the virtual UE scheme.

Figure 6:
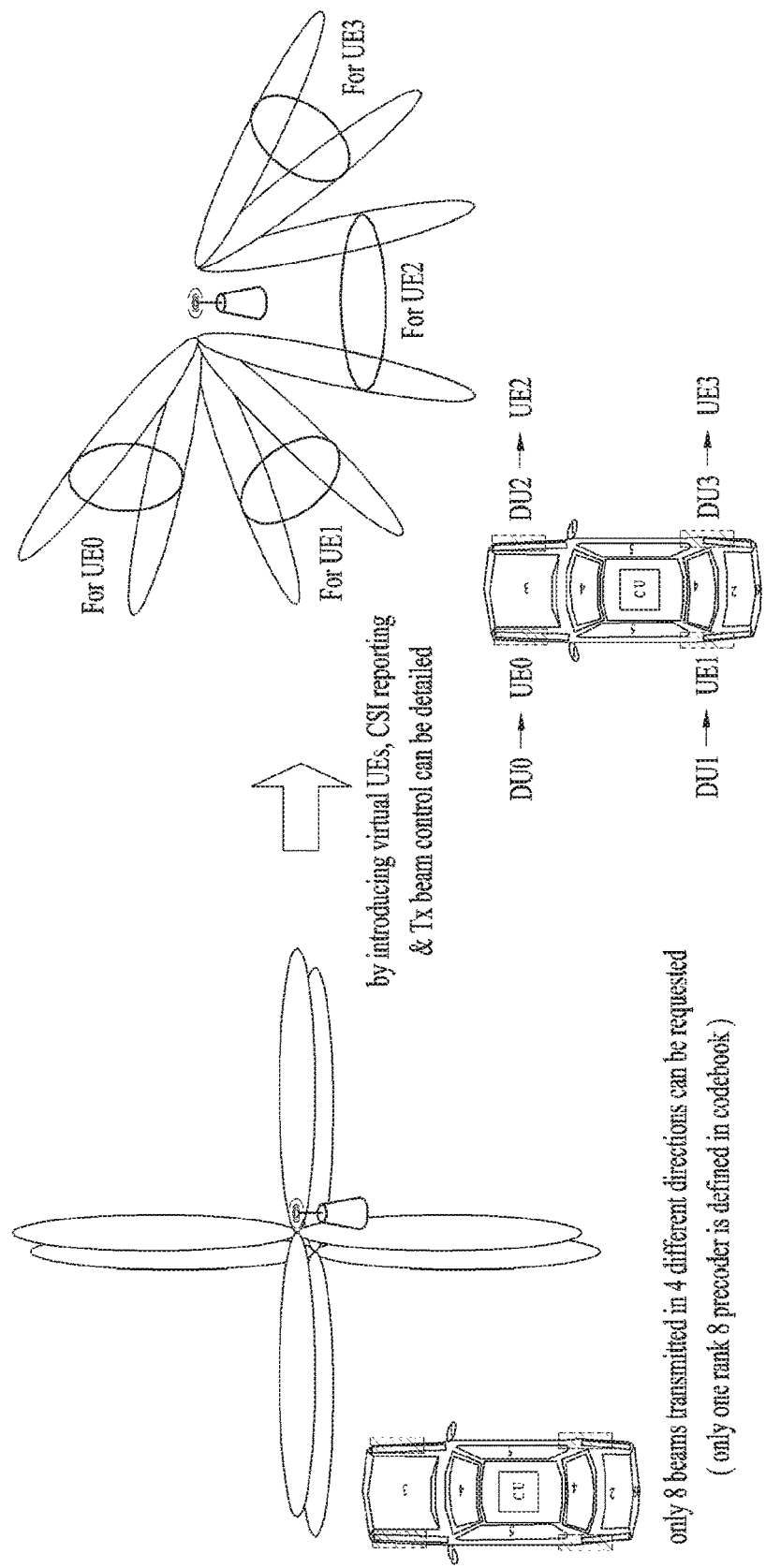
FIG. 6 is a diagram of detailed transmission (Tx) beam control by introducing virtual User Equipment (VUE) concept.

FIG. 6 is a diagram of Tx beam control by introducing the VUE concept.

Before considering the virtual UE scheme, the vehicle is considered as a single UE by the eNB and at most 8 different Tx beams can be requested for such UE in 4 different directions since only one rank 8 precoder is defined in the codebook.

In an example of the virtual UE scheme, the vehicle has 4 VUEs noted UE0, UE1, UE2, UE3 (here, each VUE includes one of the four DUs of the vehicle: DU0, DU1, DU2, DU3). Using 8 beams again, we can allocate 2 Tx beams to each of the 4 VUEs. Here, one of 16 different Tx beam combinations can be selected and used.

Figure 7:
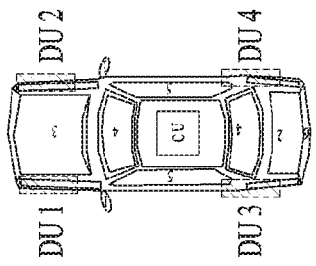
FIG. 7 shows an exemplary embodiment of defining a plurality of virtual UEs and corresponding UE IDs.

FIG. 7 shows an exemplary embodiment of defining a plurality of virtual UEs and corresponding UE IDs. FIG. 7 shows a case where the vehicle is configured with 4 DUs and one CU controlling the 4 DUs.

The vehicle can define a VUE with a combination of one or more DUs. Each of the VUEs can be configured with different combination of DUs and physical characteristics of each VUE are configured differently from each other. The VUEs can be configured to share one or more DUs so that Multiple Access Interference (MAI) for MU-MIMO access can be efficiently controlled. The VUEs can be configured to include different numbers of DUs, so that Rx performance/complexity can be set differently for each of the VUEs. A specific combination of DUs (i.e., a specific VUE) can be registered as a default user, for example the combination of all the DUs of the vehicle.

Here, a VUE differs from other VUEs in at least one of physical layer ID, cell specific UE ID (RNTI, "radio network temporary identifier"), and Rx antenna indication, etc. That is, different indication can be allocated for each of VUEs so that eNB or a part of entry of a network recognizes the differences between target (or destination) of data transmission.

FIG. 7 shows that there can be VUEs having a subset of only one distributed antenna unit, such as DU 1 and DU 2 (RNTI #1 and #2), and also VUEs having a subset of more than one distributed antenna unit, such as DU 3 & DU 4 and DU 1 & DU 2 (RNTI #4 and #5).

The above-explained virtual UE concept can be applied to systems other than the in-vehicle DAS. For example, the virtual UE concept can be applied to Massive MIMO system employing large number of Tx/Rx antennas. The proposed virtual UE scheme can reduce complexity and simplify the MIMO scheme for a large number of antennas.

Proposed Bearer Sharing Concept

Figure 8:
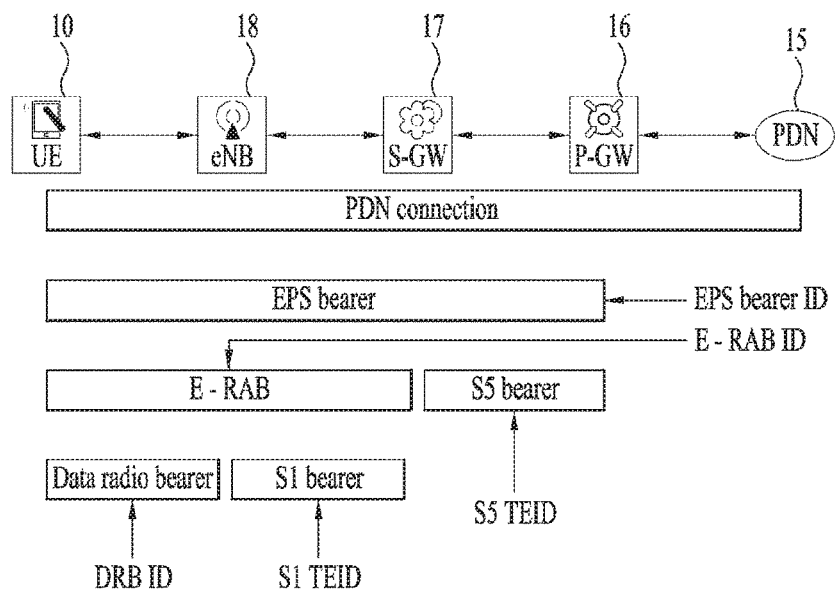
FIG. 8 shows current bearer structure in 3GPP network.

FIG. 8 shows the current bearer structure in a 3GPP network.

In the conventional circuit switched network, data is transferred through a physically predefined path. Contrary to this, when packet data networks (PDN) are concerned, the path of data transfer is logical path defining where the destination is, and where the data is relayed. This logical path within the evolved packet system (EPS) is commonly referred to as an EPS bearer.

IP connectivity between a UE and a PDN is defined within the EPS through the concepts of PDN connection and EPS bearer. A PDN connection between a UE 10 and a PDN 15 includes a default EPS bearer and possibly one more dedicated bearers. An EPS bearer, default or dedicated, uniquely identifies traffic flows that receive a common QoS treatment between a UE and the relevant network gateway. Outside the EPS, an external bearer extends the EPS bearer to complete the PDN connection.

To support the PDN connection and the EPS bearer(s) at the IP protocol layer, the lower protocol layers used in the EPS provide other kind of bearers. Between the network nodes, the bearers can be implemented using the gateway tunneling protocol (GTP). The PDN connection consists of combinations of bearers between different network entities. In FIG. 8, the EPS bearer is shown as forming the connection between a PDN gateway (P-GW) 16 interfaced with the PDN 15 and the UE 10, the connection between the P-GW 16 and an S-GW 17 can be referred to as an 'S5 bearer', the connection between the S-GW 17 and the UE 10 can be referred to as an evolved radio access bearer (E-RAB), the connection between the S-GW 17 and the eNB 18 can be referred to as an 'S1 bearer', and the connection between the eNB 18 and the UE 10 can be referred to as 'data radio bearer' or 'radio bearer'. Thus, as shown in FIG. 8, the EPS bearer consists of an E-RAB extended in the evolved packet core (EPC) by an S5 bearer using a GTP tunnel, while the E-RAB consists of a data radio bearer ("DRB") extended by an S1 bearer using a GTP tunnel at the eNB/S-GW interface. Each of the above-defined bearers is associated with a respective bearer ID with two nodes on each end point of that bearer:

- the EPS bearer is identified by an 'EPS bearer ID';
- the E-RAB is identified by an 'E-RAB ID';
- the data radio bearer is identified by an 'DRB ID';
- the S1 bearer is identified by a tunnel endpoint identifier (TEID) which is allocated by the endpoints (eNB and S-GW) of the GTP tunnel;
- the S5 bearer is identified by another TEID which is allocated by the endpoints (S-GW and P-GW) of the GTP tunnel.

There is a 1:1 relationship between the upper level bearer, that is the EPS bearer, and the underlying, lower-level bearers. By using this 1:1 relationship, the network entities can transfer packets without complex procedures, such as re-distributing packets.

Figure 9A:
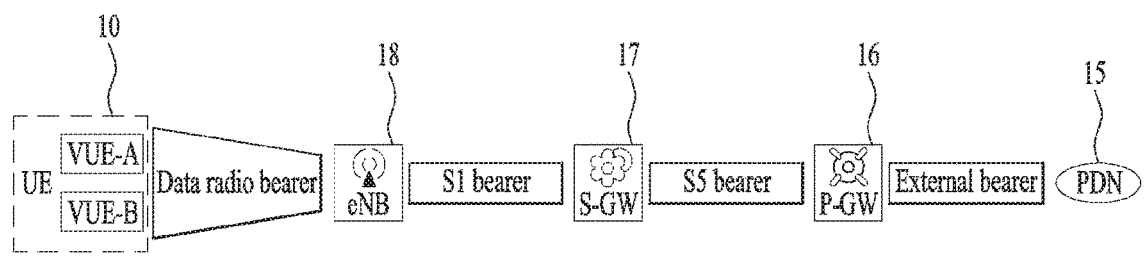
FIGS. 9A-C show examples of the proposed bearer concept to implement virtual UE scheme.

FIG. 9A shows an example of the proposed shared bearer concept to implement a virtual UE scheme.

In the example, there are two virtual UEs 11, 12 recognized as a single UE 10 by network entities other than the eNB 18. The S-GW 17 does not recognize the VUEs ('VUE-A' and 'VUE-B') as separate UEs, so it does not establish separate bearers for the VUEs. That is, the VUEs of the same UE 10 are recognized as a single UE for establishment of the network bearers: EPS bearer, E-RAB, S1 and S5 bearers.

As shown in FIG. 9A, the data radio bearer too can be shared by the multiple VUEs. That is, the data path in the network is the same as in the conventional technology, but a specific network entity, preferably the eNB 18, may distribute packets for each of VUEs based on the physical channel conditions of VUEs. Then VUEs may then be distinguished by respective RNTIs, as indicated in FIG. 7. The different RNTIs can be registered with the eNB for the respective VUEs using the known random access procedure on the radio interface.

Figure 9B:
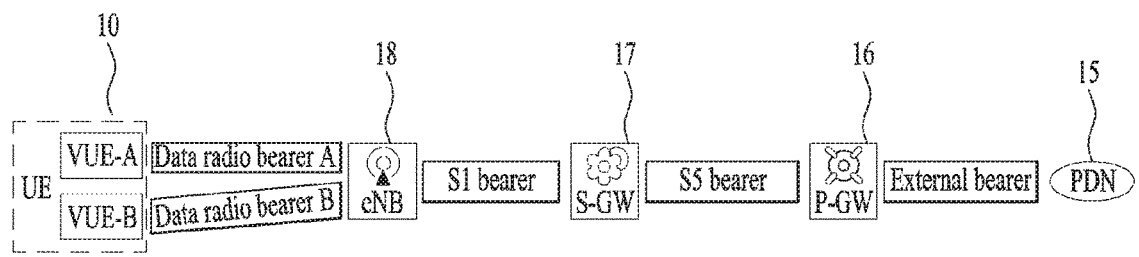

Alternatively, the VUEs pertaining to the same UE 10 may use different data radio bearers ('Data radio bearer A' and 'Data radio bearer B'), identified by respective DRB IDs, which the eNB 18 combines for transmission and reception with the S-GW 17 through a common S1 bearer, as shown in FIG. 9B. In such a case, the VUEs belonging to the same UE 10 are distinguished by their DRB-IDs and RNTIs, and the IDs of the other bearers (E-RAB ID, S1 TEID, S5 TEID, EPS bearer ID) are shared by the VUEs belonging to the UE 10. In this case too, the eNB 18 is the only network node which is aware of the different VUEs providing the service to the same user.

In another embodiment (FIG. 9C), the EPS bearer supporting a service for a user having a plurality of VUEs has an S5 bearer for the whole UE 10 of the user and a respective E-RAB for each VUE, each E-RAB having its own S1 bearer ('S1 bearer A' and 'S1 bearer B') and its own data radio bearer ('Data radio bearer A' and 'Data radio bearer B'). In this case, the VUEs belonging to the same UE 10 are distinguished by their E-RAB IDs, S1 TEIDs, DRB-IDs and RNTIs, and the IDs of the other bearers (S5 TEID, EPS bearer ID) are shared by the VUEs belonging to the UE. The eNB 18 and the S-GW 17 are then the network nodes which are aware of the different VUEs providing the service to the same user.

Applications of the Proposed Scheme

In the current PDN system, the bearer (logical path) is established per user and per service. So, when one user requests two or more services having different QoS, two or more EPS bearers are established, one for each service or QoS level. For example, when an UE requests a real-time traffic service (e.g. voice over IP, VoIP, service) and a best-effort service (e.g. file download service) at the same time, the network configures EPS bearers to support the services. In another example, when two or more users request the same type of service, the network may establish bearers for each of the users and provide that service through each of the bearers to the corresponding user.

Figure 9C:
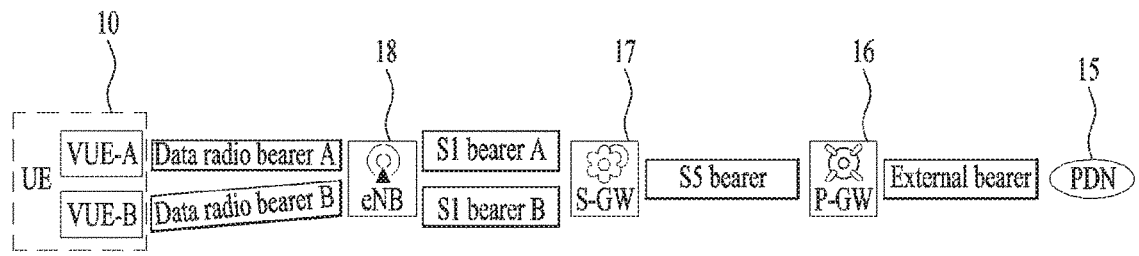

In the proposed scheme, when a user registers multiple VUEs with the network for dedicated high rank transmission beam control for high data rate and desires to receive the same service via the plurality of users, for example when the user registers two VUEs for a large size file download service, the network may establish a single EPS bearer for that service with the recognition that the multiple (virtual) UEs are of the same UE. The bearer structure for this scheme may be as shown in FIG. 9A, or alternatively as shown in FIG. 9B or FIG. 9C. By using this scheme, the network can avoid wasting resources compared to the situation where the VUEs are treated as separate UEs and the same service is repeated in the EPC.

Figure 10:
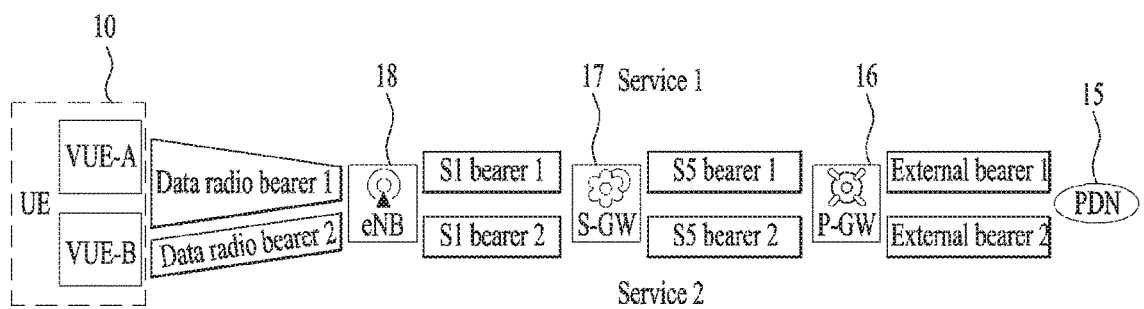
FIG. 10 shows a case when a UE requests multiple services to the network.

FIG. 10 shows a case when a UE requests multiple services to the network.

When a UE 10 requests multiple services with different level of QoS to the network, the UE 10 may register DUs, or groups of DUs, as multiple VUEs as discussed in connection with FIG. 7. The network may establish a respective bearer for each of the services. As shown in FIG. 10, the bearer for 'Service 1' can be shared by 2 VUEs while the bearer for 'Service 2' is not shared. Different connections like these provide flexibility. For example, the network can effectively provide different kinds of services (e.g. a service with low data rate but very sensitive to the latency, and a service with high data rate) to the UE 10. In order to support this scheme, the support of multiple-to-multiple connections is preferred.

Protocol Architecture

Figure 11:
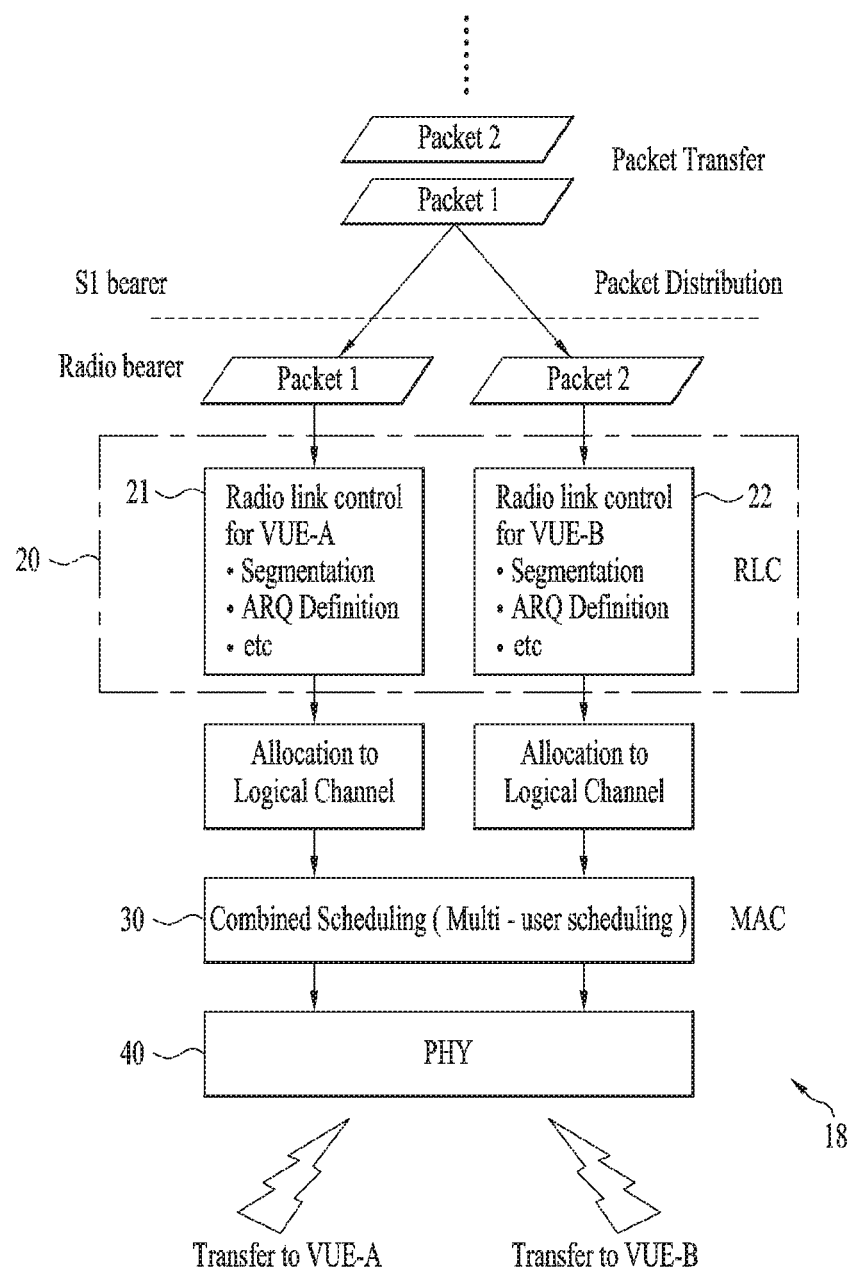
FIGS. 11 and 12 show an exemplary architecture to a support virtual UE concept in one embodiment of the present invention, on the network (eNB) side and on the UE side, respectively.
Figure 12:
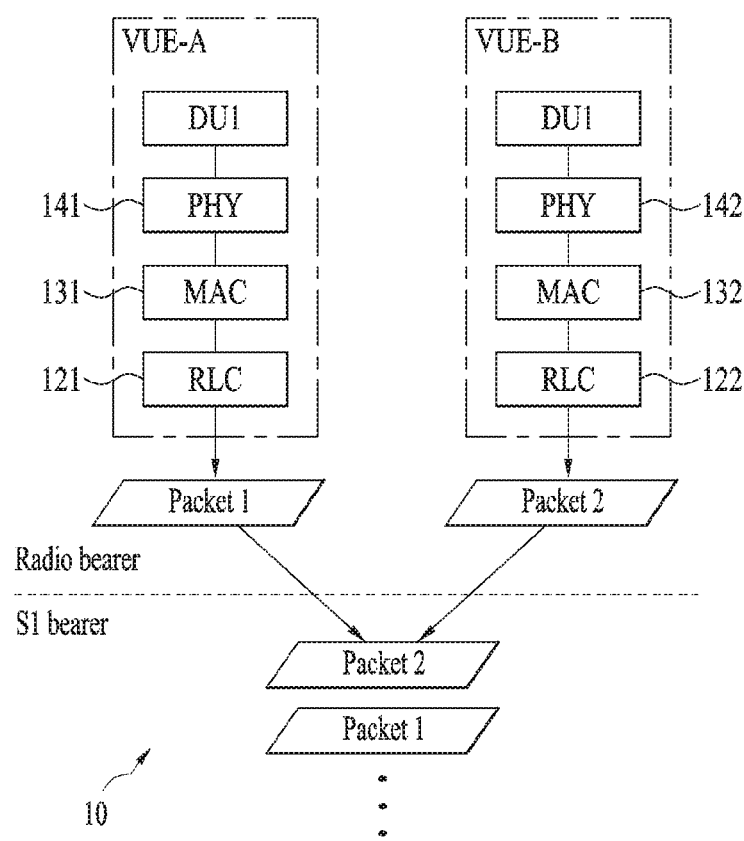

FIGS. 11 and 12 show exemplary architectures to support the virtual UE concept of an embodiment of the present invention, in a case where shared bearers are implemented as shown in FIG. 9A.

In order to implement dedicated high rank transmission beam control via virtual user registration, separate link control between data reaching an eNB 18 via the same S1 bearer but which is transmitted to different (virtual) user terminals in the same UE should be implemented.

For this, a hierarchical protocol structure is proposed, in which a plurality of controllers are implemented within the same data radio bearer (logical path between an eNB 18 and a UE 10) to perform separate link control per wireless link connected to different (virtual) user terminals in the same UE.

The controller refers to a header added per packet unit for traffic delivered to the eNB 18 in packet units or a radio traffic stack for managing the header, for example, a radio link control (RLC) stack.

FIG. 11 shows an example of a transmission structure for implementing separate link control of each virtual user at the eNB 18 for delivering data to a user having two user IDs (e.g. RNTIs) via virtual user registration via the same data radio bearer.

In the embodiment of FIG. 11, the eNB 18 separates downlink packets received from the S-GW 17 through the S1 bearer in the RLC (radio link control) layer when the UE 10 for which the packets are intended is configured to have plural VUEs. Thus, the eNB 18 has a radio link controller 20, in charge of the RLC layer, configured to establish a plurality of RLC entities 21, 22 each responsible, in a known manner, for the functions of packet segmentation and reassembly, of automatic repeat request (ARQ) control, etc., for a given logical channel. Different packets processed by the RLC layer entities 21, 22 are assigned to respective logical channels and provided to the medium access control layer 30 for transmission through the physical layer 40. The MAC layer 40 sees the logical channels relating to VUEs of a same UE 10 like logical channels relating to different UEs.

Regarding uplink transmission, if VUEs are also used, the RLC entities 21, 22 of the eNB 18 process the data received through the MAC layer 30 and build the IP packets for tunneling into the EPC via the S1 bearer.

FIG. 12 illustrates a symmetrical implementation on the UE side. It shows the UE 10 having, in the example, distributed antenna units DU1, DU2 each of which is associated with its respective physical layer entity 141, 142, its respective MAC layer entity 131, 132 and its respective RLC layer entity 121, 122, thus forming two virtual UEs, VUE-A and VUE-B. Typically the physical, MAC and RLC layer entities 141, 142, 131, 132, 121, 122 associated with the VUEs are implemented in the CU of the UE which also implements the S1 bearer endpoint where the packets transiting via the VUEs are originating (uplink) or transmitted (downlink).

Figure 13:
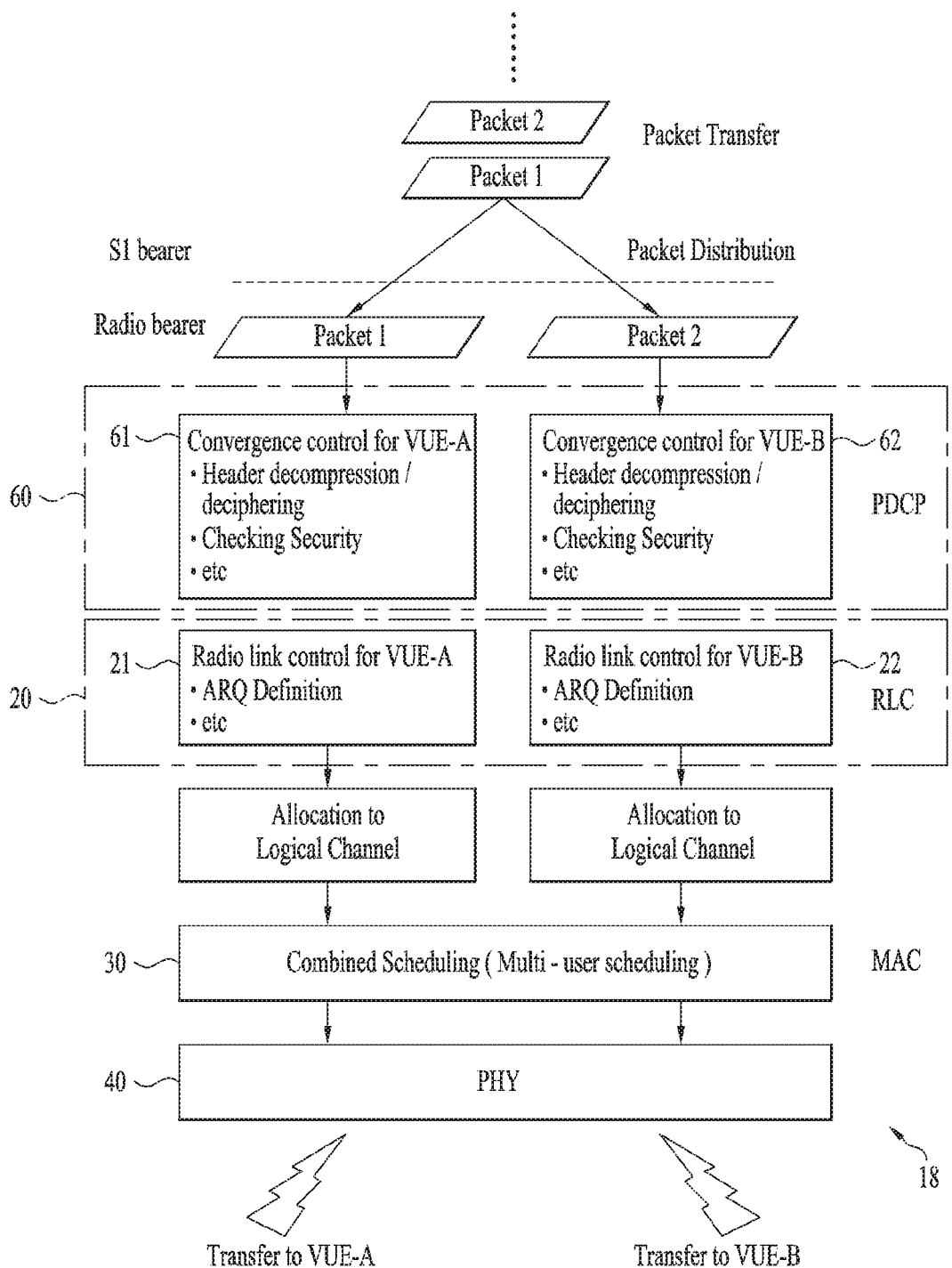
FIGS. 13 and 14 show alternative architectures to support the virtual UE concept in another embodiment of the present invention, on the network side and on the UE side, respectively.
Figure 14:
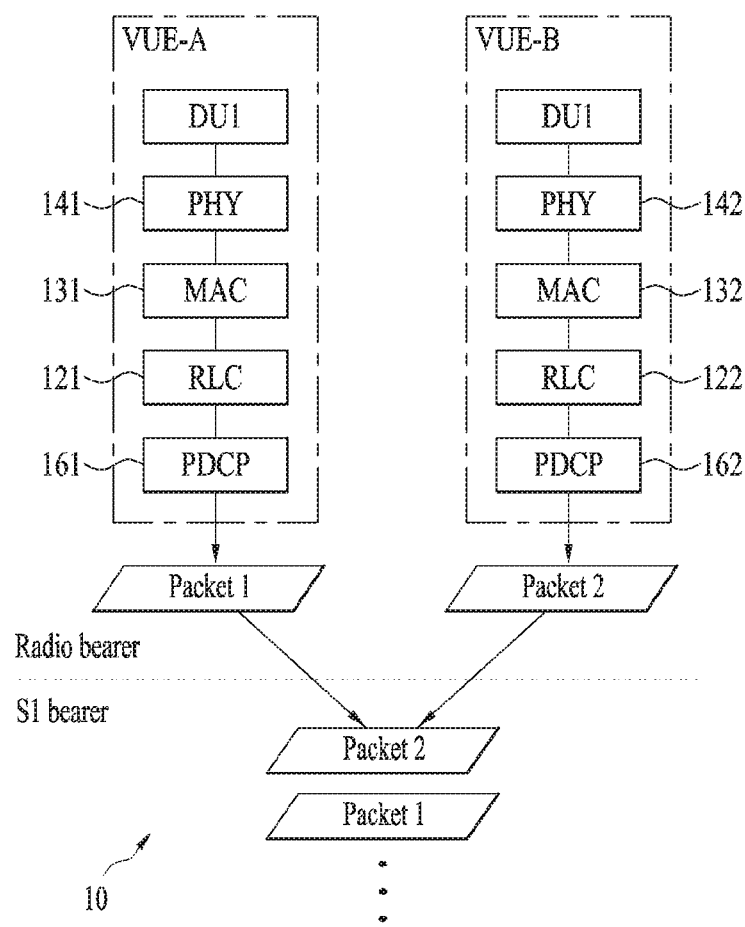

FIGS. 13 and 14 show alternative architectures to support the virtual UE concept in another embodiment of the present invention. Here too, the shared bearer concept is implemented as shown in FIG. 9A.

In the embodiment of FIGS. 13-14, protocol entities higher than RLC in the protocol stack are separately configured to sub-divide (virtual) per-UE transmission control functions. Here, the separation takes place in the packet data convergence protocol (PDCP) layer, which manages the IP header. The eNB 18 has a PDCP controller 60 including a respective control entity 61, 62 for each of VUEs, VUE-A and VUE-B, (FIG. 13) and the underlying RLC layer is also separated. The protocol stack on the UE side is symmetrically configured to have a PDCP control entity 161, 162 in each of the VUEs on top of the RLC layer 121, 122 (FIG. 14).

Device Configuration

Figure 15:
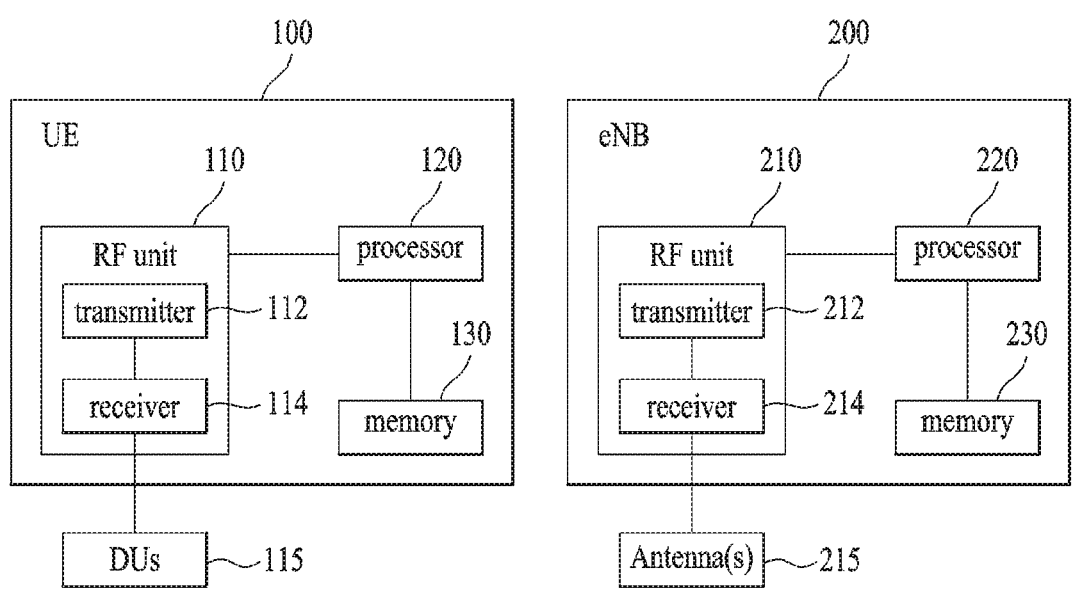
FIG. 15 is a block diagram for a UE and a eNB in accordance with the present invention.

FIG. 15 is a block diagram for a UE and an eNB in accordance with an embodiment of the present invention.

In FIG. 15, a user equipment 100 and an eNB 200 can include a radio frequency (RF) unit 110/210, a processor 120/220 and a memory 130/230, respectively. Although FIG. 15 shows a one-to-one communication environment between the UE 100 and the eNB 200, the communication environment can be constructed between a plurality of UEs and the eNB 200. And, the eNB 200 depicted in FIG. 15 can be applied to both a macro cell eNB and a small cell eNB.

Each of the RF units 110/210 includes a transmission unit 112/212 and a reception unit 114/214, respectively. The transmission unit 112 and the reception unit 114 of the UE 100 are coupled to the distributed antenna units (DUs) 115 of the UE which may be mapped to different VUEs as described above. They are configured to transmit and receive a signal with the eNB 200. They can be referred to as a 'transceiver' 110. The processor 120 is functionally connected with the transmission unit 112 and the reception unit 114 and is configured to control the transmission unit 112 and the reception unit 114 to transmit and receive signal with different devices. And, the processor 120 performs various processing on a signal to be transmitted and transmits the signal to the transmission unit 112. The processor performs processing on a signal received by the reception unit 114.

If necessary, the processor 120 can store information included in an exchanged message in the memory 130. The UE 100 can perform the aforementioned various embodiments of the present invention with the above-mentioned structure associated with plural antenna units which may be associated with different VUEs.

The transmission unit 212 and the reception unit 214 of the eNB 200 are coupled to one or more antennas 215 of the eNB and configured to transmit and receive a signal with different UEs. They can be referred to as a 'transceiver' 210. The processor 220 is functionally connected with the transmission unit 212 and the reception unit 214 and is configured to control the transmission unit 212 and the reception unit 214 to transmit and receive signal with different devices. And, the processor 220 performs various processing on a signal to be transmitted and transmits the signal to the transmission unit 212. The processor performs processing on a signal received by the reception unit 214. If necessary, the processor 220 can store information included in an exchanged message in the memory 230. The eNB 200 can perform the aforementioned various embodiments of the present invention with the above-mentioned structure.

Each of the processors 120/220 of the UE 100 and the eNB 200 indicates (e.g., control, adjust, manage) operations in the UE 100 and the eNB 200. Each of the processors 120/220 can be connected with the memory 130/230 storing program codes and data. The memory 130/230 is connected with the processor 120/220 and stores an operating system, an application, and general files.

The processor 120/220 of the present invention can be named by such a terminology as a controller, a microcontroller, a microprocessor, a microcomputer and the like. Meanwhile, the processor can be implemented by hardware, firmware, software and a combination thereof. In the implementation by hardware, ASICs (application specific integrated circuits), DSPs (digital signal processors), DSPDs (digital signal processing devices), PLDs (programmable logic devices), FPGAs (field programmable gate arrays) and the like configured to perform the present invention can be installed in the processor 120/220.

Meanwhile, the aforementioned method can be written by a program executable in a computer and can be implemented by a general digital computer capable of operating the program using a computer readable medium. And, data structure used for the aforementioned method can be recorded in the computer readable medium in various means. Program storing devices usable for explaining a storing device including an executable computer code to perform various methods of the present invention should not be comprehended as temporary objects such as carrier waves and signals. The computer readable medium includes such a storing medium as a magnetic storing medium (e.g., a ROM, a floppy disk, a hard disk and the like) and an optical reading medium (e.g., a CD-ROM, a DVD and the like).

While the present invention has been described and illustrated herein with reference to the preferred embodiments thereof, it will be apparent to those skilled in the art that various modifications and variations can be made therein without departing from the scope of the invention. Thus, the disclosed methods should be considered in an explanatory viewpoint instead of a limitative viewpoint. The scope of the present invention is shown at not the detail description of the invention but the appended claims. Thus, it is intended that the present invention covers the modifications and variations of this invention that come within the scope of the appended claims and their equivalents.

INDUSTRIAL APPLICABILITY

While the present document mainly discuss this with the example of implementing in-vehicle DAS system, it is only exemplary, and the proposed scheme/structure can be used for simple configuration of MIMO system with increased number of codewords/layers.

What is claimed is:

1. A method for a user equipment, UE, to receive a service from a network in a wireless communication system, wherein the UE has multiple antenna units, the method comprising:
   registering a plurality of radio network temporary identifiers (RNTIs) at a first node of the network,
   wherein each of the plurality of RNTIs indicates one or more of a plurality of distributed units (DUs) in the UE, the DUs being spaced physically apart from each other within the UE, each of the DUs including a respective subset of at least one of the multiple antenna units of the UE; and
   receiving, from the network, the service through one or more radio bearers configured between the UE and the first node of the network based on at least one of the plurality of RNTIs,
   wherein, when one of the plurality of RNTIs indicates two or more DUs among the plurality of the DUs, the two or more DUs use a same radio bearer to receive the service from the network.

2. The method of claim 1, wherein receiving the service through the one or more radio bearers is performed via a plurality of logical channels between the first node and the plurality of the DUs.

3. The method of claim 2, further comprising, for each of the logical channels:
   configuring a first Radio Link Control (RLC) protocol entity in the first node of the network and a second RLC protocol entity in the UE.

4. The method of claim 3, further comprising, for each of the logical channels:
   configuring a first Packet Data Convergence Protocol (PDCP) entity in the first node of the network and a second PDCP entity in the UE,
   wherein the first and second PDCP entities manage internet protocol (IP) headers of service data processed by the first and second RLC protocol entities.

5. The method of claim 1, wherein the plurality of DUs of the UE are recognized as one UE by nodes of the network other than the first node.

6. The method of claim 1, wherein the one or more bearers for receiving the service by using the plurality of RNTIs provides internet protocol (IP) connectivity between the UE and a network gateway interfaced with a packet data network.

7. The method of claim 1, wherein a plurality of radio bearers are established for multiple services from the network, and
   wherein the plurality of radio bearers comprise the radio bearer for receiving the service by using the plurality of RNTIs and at least one other bearer established by using a RNTI associated with one DU.

8. The method of claim 1, wherein the first node is a base station that establishes the one or more radio bearers with the UE and establishing one or more S1 bearers with a serving gateway (S-GW) of the network.

9. The method of claim 8, wherein the plurality of RNTIs used to receive the service through the one or more bearers are associated with respective DUs which share one radio bearer related with one S1 bearer.

10. The method of claim 1, wherein the UE comprises a vehicular UE employing an in-vehicle Distributed Antenna System (DAS).

11. A method for a network to provide a service to a user equipment (UE) in a wireless communication system, wherein the UE has multiple antenna units, the method comprising:
    registering a plurality of radio network temporary identifiers (RNTIs) at a first node of the network, wherein each of the plurality of RNTIs indicates one or more of a plurality of distributed units (DUs) in the UE, the DUs being spaced physically apart from each other within the UE, each of the DUs including a respective subset of at least one of the multiple antenna units of the UE; and
    providing the service to the UE through one or more radio bearers configured between the UE and the first node of the network based on at least one of the plurality of RNTIs,
    wherein, when one of the plurality of RNTIs indicates two or more DUs among the plurality of the DUs, the network uses one of the one or more radio bearers to provide the service to the two or more DUs.

12. A user equipment (UE) for receiving a service from a network in a wireless communication system, the UE comprising:
    multiple antenna units;
    a plurality of distributed units (DUs), being spaced physically apart from each other within the UE, each of the DUs including a respective subset of at least one of the multiple antenna units of the UE;
    a transceiver coupled to the multiple antenna units and configured to transmit or receive signal to or from the network; and
    a processor connected to the transceiver and configured to control the transceiver, wherein the processor is further configured:
- to register a plurality of radio network temporary identifiers (RNTIs) at a first node of the network, wherein each of the plurality of RNTIs indicates one or more of the plurality of DUs in the UE; and
- to receive, from the network, the service through one or more radio bearers configured between the UE and the first node of the network based on at least one of the plurality of RNTIs,
- wherein, when one of the plurality of RNTIs indicates two or more DUs among the plurality of the DUs, the two or more DUs use a same radio bearer to receive the service from the network.

13. A network node for providing a service to a user equipment, UE, having multiple antenna units in a wireless communication system, the network node comprising:
- a transceiver configured to transmit or receive signal to or from the UE; and
- a processor connected to the transceiver and configured to control the transceiver,
- wherein the processor is further configured:
  - to register a plurality of radio network temporary identifiers (RNTIs), wherein each of the plurality of RNTIs indicates one or more of a plurality of distributed units (DUs) in the UE, the DUs being spaced physically apart from each other within the UE, each of the DUs including a respective subset of at least one of the multiple antenna units of the UE; and
  - to provide the service to the UE through one or more radio bearers configured between the UE and the first node of the network based on at least one of the plurality of RNTIs,
  - wherein, when one of the plurality of RNTIs indicates two or more DUs among the plurality of the DUs, the processor uses one of the one or more radio bearers to provide the service to the two or more DUs.

* * * * *